United States Patent
Oswal et al.

(10) Patent No.: US 7,574,209 B2
(45) Date of Patent: Aug. 11, 2009

(54) DYNAMICALLY OBTAINING NEIGHBORHOOD INFORMATION

(75) Inventors: Anand K. Oswal, Santa Clara, CA (US); John G. Waclawsky, Frederick, MD (US); Jayaraman R. Iyer, Sunnyvale, CA (US); Viren K. Malaviya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/105,006

(22) Filed: Apr. 13, 2005

(65) Prior Publication Data

US 2006/0234713 A1    Oct. 19, 2006

(51) Int. Cl.
*G06F 15/16* (2006.01)
(52) U.S. Cl. ........................... 455/436; 455/445
(58) Field of Classification Search .............. 455/422.1, 455/434, 436, 438, 439, 442, 445; 370/331, 370/332

See application file for complete search history.

(56) References Cited

U.S. PATENT DOCUMENTS

| | | | |
|---|---|---|---|
| 6,240,082 B1 | 5/2001 | Kim et al. | 370/342 |
| 6,259,419 B1 | 7/2001 | Monte | 343/890 |
| 6,353,602 B1 * | 3/2002 | Cheng et al. | 455/442 |
| 6,611,751 B2 | 8/2003 | Warren | 701/200 |
| 2003/0002537 A1 * | 1/2003 | Schaller | 370/503 |
| 2003/0109284 A1 * | 6/2003 | Akerberg et al. | 455/561 |
| 2003/0179731 A1 * | 9/2003 | Noguchi et al. | 370/331 |
| 2006/0056351 A1 * | 3/2006 | Wall | 370/331 |
| 2006/0221888 A1 * | 10/2006 | Sebire et al. | 370/328 |

* cited by examiner

*Primary Examiner*—Sam Bhattacharya
(74) *Attorney, Agent, or Firm*—Baker Botts L.L.P.

(57) ABSTRACT

Obtaining neighborhood information for a cell includes establishing the presence of a mobile node in a first cell having a first cell site. A communication session for the mobile node is facilitated. Neighborhood information is determined in response to facilitating the communication session. The neighborhood information describes a second cell having a second cell site. The neighborhood information is recorded in a neighborhood information record.

27 Claims, 2 Drawing Sheets

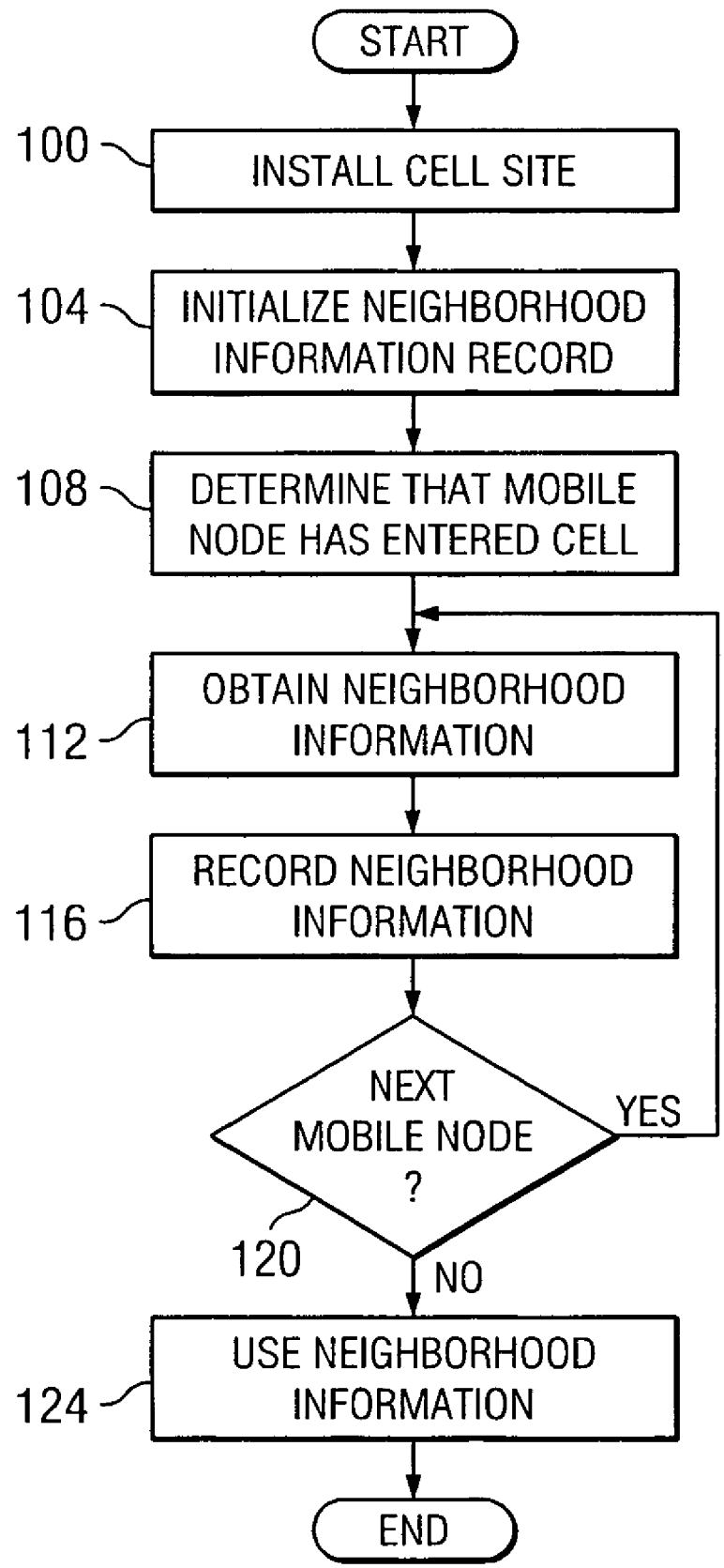

DYNAMICALLY OBTAINING NEIGHBORHOOD INFORMATION

TECHNICAL FIELD

This invention relates generally to the field of communications and more specifically to dynamically obtaining neighborhood information.

BACKGROUND

A communication network may provide wireless services to an area partitioned into geographic units called "cells." A cell typically includes a cell site that provides wireless services to mobile nodes present in the cell. The cell site maintains information about the neighboring cells in order to provide the services. Known techniques for maintaining the information include manually provisioning the cell site with the information. These techniques, however, are not efficient in certain situations. It is generally desirable to have efficient techniques in certain situations.

SUMMARY OF THE DISCLOSURE

In accordance with the present invention, disadvantages and problems associated with previous techniques for obtaining neighborhood information may be reduced or eliminated.

According to one embodiment of the present invention, obtaining neighborhood information for a cell includes establishing the presence of a mobile node in a first cell having a first cell site. A communication session for the mobile node is facilitated. Neighborhood information is determined in response to facilitating the communication session. The neighborhood information describes a second cell having a second cell site. The neighborhood information is recorded in a neighborhood information record.

Certain embodiments of the invention may provide one or more technical advantages. A technical advantage of one embodiment may be that a cell site of a cell may dynamically obtain neighborhood information describing the neighbor cells of the cell. Dynamically obtaining the neighborhood information may allow the cell site to have updated neighborhood information. Another technical advantage of one embodiment may be that the neighborhood information may be recorded in a neighborhood information record to develop a detailed description of the neighbor cells. The detailed description may allow the cell site to provide improved communication services to mobile nodes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method operable to dynamically obtain neighborhood information for a cell.

DETAILED DESCRIPTION OF THE DRAWINGS

Figure 1:
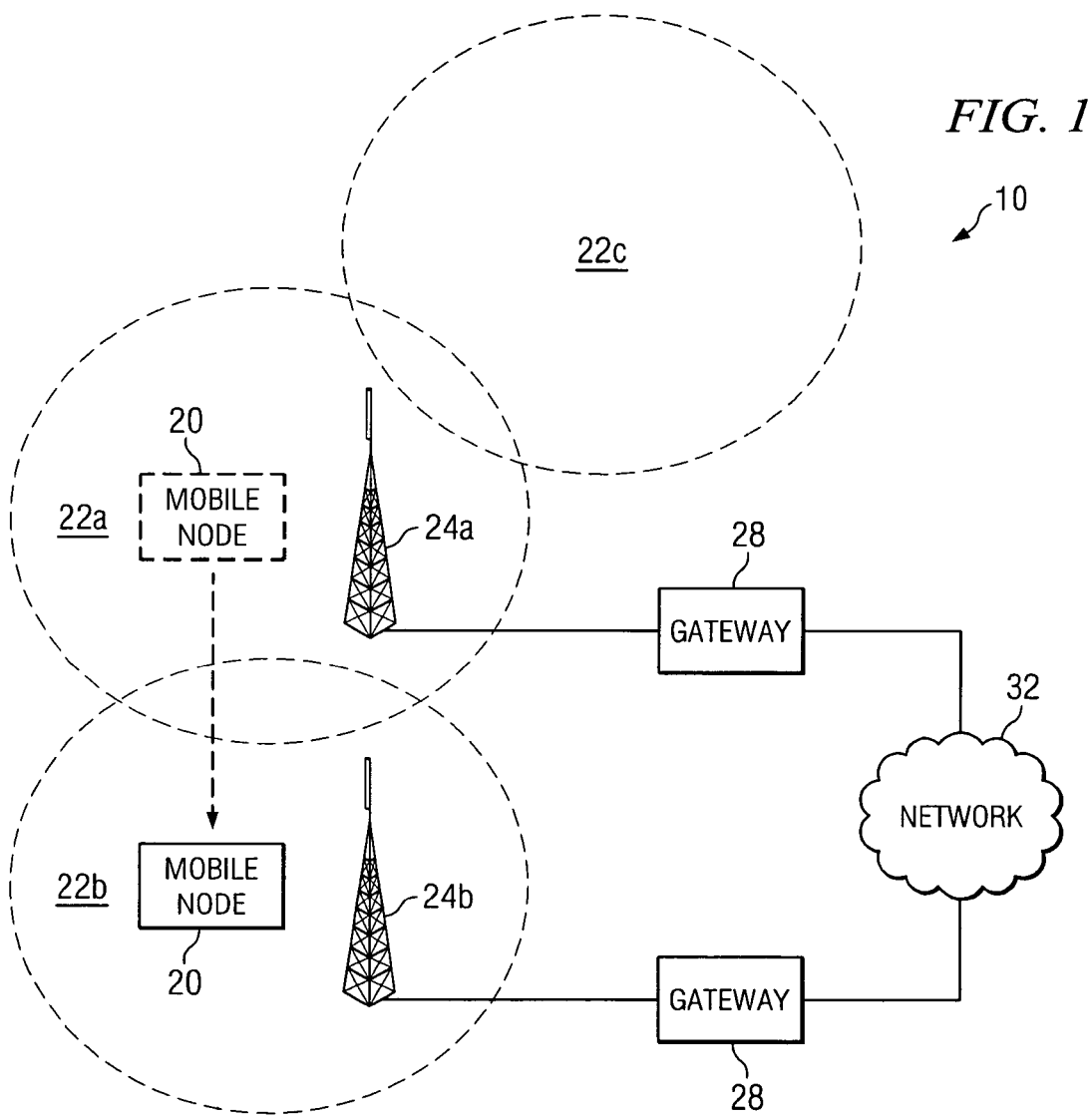
FIG. 1 is a block diagram illustrating one embodiment of a system that includes a neighborhood manager operable to dynamically obtain neighborhood information for a cell.
Figure 2:
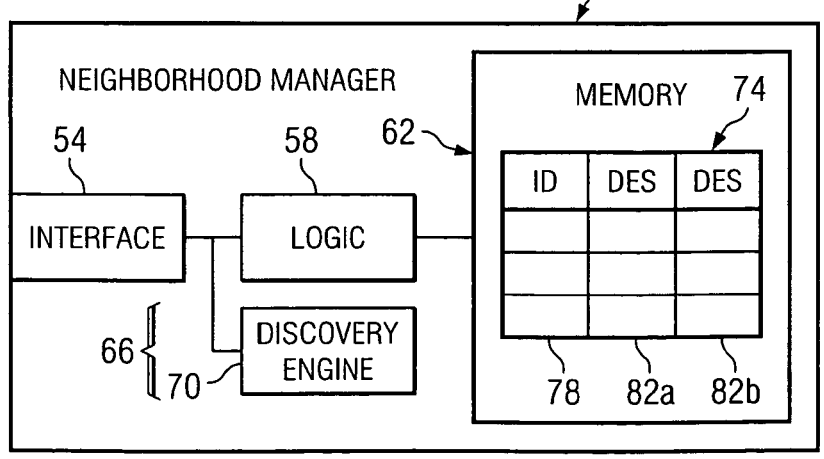
FIG. 2 is a block diagram illustrating one embodiment of a neighborhood manager that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 that includes a neighborhood manager operable to dynamically obtain neighborhood information for a cell. The neighborhood information describes the neighbor cells of the cell, and may be obtained as a mobile node moves into the cell. Dynamically obtaining the neighborhood information may allow the cell to have updated neighborhood information.

According to the illustrated embodiment, mobile node 20 may represent any suitable logic comprising software, hardware, other logic, or any suitable combination of the preceding operable to communicate with a communication system. Mobile node 20 may comprise, for example, a personal digital assistant, a computer such as a laptop, a cellular telephone, a mobile handset, or any other device operable to communicate with system 10.

System 10 may operate to provide services such as communication sessions for endpoints such as mobile node 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 10 may utilize digital protocols and technologies to provide the communication sessions. Example digital protocols and technologies include those set by the Institute of Electrical and Electronics Engineers, Inc. (IEEE) 802.xx standards such as 802.11 and 802.16 standards, the Global System for Mobile communications (GSM) standards, the Internet Engineering Task Force (IETF) standards, or other standard. GSM standards may support technology such as general packet radio service (GPRS) technologies, and IETF standards may support code division multiple access (CDMA) technologies.

According to the illustrated embodiment, system 10 includes a plurality of cells 22, a plurality of cell sites 24, one or more gateways 28, and a network 32 coupled as shown. A cell 22 represents a geographic unit of a network attachment point of a communication network. As an example, cell 22 may represent a cell of a cellular network. As another example, cell 22 may represent a hot spot in a wireless network such as in an IEEE 802.11 Wi-Fi Alliance network or an IEEE 802.16 WiMAX Forum network. As another example, cell 22 may represent a geographic unit for a network of any suitable technology, such as digital subscriber line (DSL) or cable. A cell 22 may have a cell identifier. A cell identifier may uniquely identify a cell 22, and may comprise any suitable identifier. For example, a cell identifier may comprise an address such as a medium access control (MAC) address or an IPvx, such as IPv4 or IPv6. address for an access point.

A cell 22 includes a cell site 24 that provides wireless services, such as wireless access, to mobile nodes 20 present in the cell 22. A mobile node 20 may be present in cell 22 if mobile node 20 is within the range of cell site 24 of cell 22. Cell site 24 operates as an access point to provide wireless services. An access point may refer to a network point that couples a wireless network, such as a wireless radio network, to a wired network, such as a wired area network. Cell site 24 may represent a base station, an access point, a network attachment point, other device operable to provide wireless services, or any combination of the preceding.

Cell site 24 may facilitate a handover procedure. A handover procedure may refer to the process by which a communication session for mobile node 20 is passed from a previous cell site 24a to a current cell site 24b as mobile node 20 moves from a previous cell 22a to a current cell 22b. A previous cell 22a refers to the cell 22 in which mobile node 20 is present prior to a handoff, and a current cell 22b refers to the cell 22 in which mobile node 20 is present after the handoff. Cell site 24 operates to redirect packets, such as traffic or control packets, in response to movement of mobile node 20.

A cell site 24 of a cell 22 may comprise any suitable logic comprising software, hardware, other logic, or any suitable combination of the preceding operable to provide wireless services to mobile nodes 20 present in cell 22. According to one embodiment, cell site 24 includes a base transceiver station and a base station controller. The base transceiver station communicates signals to and from mobile node 20 through a wireless link. The wireless link is typically a radio frequency link. The base station controller manages the operation of the base transceiver station.

A neighbor cell 22a of a cell 22b may refer to a physical or logical neighbor of cell 22b. A physical neighbor cell 22a of cell 22b may refer to a cell 22a that is geographically proximate to cell 22b. As an example, a physical neighbor cell 22a may be adjacent to or overlapping with cell 22b. As another example, a physical neighbor cell 22a may be one, two, . . . , n cells away from cell 22b. where n represents any suitable number, for example, $1 \leq n \leq 10$. such as $2 \leq n \leq 5$. A logical neighbor cell 22a of cell 22b may refer to a cell 22a with which cell 22b performs repeated hand-offs. As an example, different network attachment points for which repetitive hand-offs are performed may be considered logical neighbor cells 22. Neighbor cells 22 may use different technologies. For example, cell 22a may use wireless technology, and cell 22b may use wired technology.

According to one embodiment, cell site 24b may include a neighborhood manager. For example, the neighborhood manager may be included in a cell site router of cell site 24b. A neighborhood manager may refer to an entity that gathers neighborhood information, and records the information in a neighborhood information record. Neighborhood information for cell 22b may refer to information that describes the neighbors of cell 22b. Neighborhood information may be used to facilitate a communication session for mobile node 22. For example, the information may be used to facilitate the transfer of a communication session to or from a neighbor cell 22a, to manage the delivery of a communication service, or to improve a communication service.

Neighborhood information may include, for example, information describing the communication network, one or more cells 22, a communication session of mobile node 20, or other suitable subject. Communication network information may include network parameters, network profiles, cache locations, network capacity, or other suitable information. Cell information may include cell identifiers, signal strength of signals from cell 22, identification of the technology used by cells 22, or other suitable information.

Communication session information may include user profiles, security information, technology identification, mobility information, billing information, service profiles, cache information, other suitable information for supporting a communication session, or any combination of the preceding. Security information may refer to information used to establish the access allowed to mobile node 20. Technology identification may refer to an identification of the technology used by mobile node 20. Mobility information may refer to information used to transfer a communication session to a new network. Billing information may refer to information used to assess a cost for the communication session. Service profiles may refer to information used to provide services during the communication session. The neighborhood manager and neighborhood information are described in more detail with reference to FIG. 2.

A gateway 28 allow mobile node 20 to communicate with network 32. A gateway 28 may represent any suitable logic comprising software, hardware, other logic, or any suitable combination of the preceding operable to interconnect with network 32. Gateway 28 may convert communications between different communication protocols. For example, gateway 28 may convert communications from a protocol to any of various other protocols that may be used by network 32, or vice-versa. According to one embodiment, gateway 28 may include the neighborhood manager.

Network 32 comprises a communication network that allows mobile node 20 to communicate with other networks or devices. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. Network 32 may operate according to the Internet Protocol. In general, the Internet Protocol tracks the Internet addresses of nodes, routes outgoing messages, and recognizes incoming messages.

Network 32 may include any suitable networks or devices that allow mobile node 20 to communicate with other networks or devices. As an example, network 32 may include an operator network comprising a communication network that is operated by a specific operator. An operator network may operate according to any suitable technology, such as wireless, cable, optical, other wireline or wireless technology, or any combination of the preceding.

As another example, network 32 may include a home network that includes a home agent and a foreign network that includes a foreign agent. A home agent of a mobile node may refer to an agent that maintains the address of the mobile node and forwards data to the mobile node. A foreign agent of a mobile node may refer to an agent that provides the home agent of the mobile node with an address to which data for the mobile node may be forwarded.

As yet another example, network 32 may include a server that provides functionality requested by mobile node 20. Functionality may refer to providing a service such as a telephony or data service, providing information, other functionality, or any combination of the preceding. Telephony service may refer to any suitable service provided during a communication session.

A component of system 10 may include an interface, logic, memory, other component, or any suitable combination of the preceding. As used in this document, "interface" refers to any suitable structure of a device operable to receive input for the device, send output from the device, performing suitable processing of the input or output or both, or any combination of the preceding, and may comprise one or more ports, conversion software, or both. Logic manages the operation of module, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by a processor, and may comprise Random Access Memory (RAM), Read Only Memory (ROM), magnetic drives, disk drives, Compact Disk (CD) drives, Digital Video Disk (DVD) drives, removable media storage, any other suitable data storage device, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of cell site 24 and gateway 28 may be performed by one module, or the operations of cell site 24 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a block diagram illustrating one embodiment of a neighborhood manager 50 that may be used with the system of FIG. 1. For purposes of illustration, neighborhood manager 50 is assumed to be located at cell site 24b According to the illustrated embodiment, neighborhood manager 50 includes an interface (IF) 54, logic 58, a memory 62, and one or more applications 66 coupled as shown. Interface 54, logic 58, and memory 62 may be as described with reference to FIG. 1.

According to the illustrated embodiment, memory 62 stores a neighborhood information record 74. Neighborhood information record 74 records neighborhood information. Record 74 may organize information about neighbor cells 22a according to cell identifiers (IDs) 78 and descriptors (DESs) 82 describing features of cells 22a. A particular cell has a specific descriptor value for a descriptor 82.

Descriptors 78 may include cell parameters, service profiles, state information, other information describing features, or any combination of the preceding. A cell parameter describes a predefined feature of a neighbor cell 22a. For example, a cell parameter may describe the technology, frequency, protocol, or other process used by cell site 24a. As another example, a cell parameter may describe one or more neighbors of neighbor cell 22a that may be j hops away from cell 22a. Cell 22b may use this information to discover the neighbors of neighbor cell 22a. A service profile may describe a service offered by neighbor cell site 24a. As an example, a service profile may describe the quality of service expected for a particular service. State information may describe the state at neighbor cell 22a. As an example, state information may describe the usage, traffic, latency, or other state feature of cell 22a.

The entries of record 74 may be deleted after a predetermined period of time. For example, certain descriptors 82, such as state information descriptors 82, may include time-sensitive information that is not relevant after a certain period of time. The value of these descriptors 82 may be timed out after the period of time.

Although the illustrated record 74 organizes neighborhood information according to cells 22, the neighborhood information may be organized in any suitable manner. For example, the neighborhood information may be organized according to zones. A zone may refer to a set of cells 22 grouped in any suitable manner. For example, cells 22 may be grouped according to parameters such as service capabilities. As an example, a service may be shared among the cells 22 of a zone, and record 74 may be restricted to include only cells 22 capable of delivering the services.

Applications 66 may include software operable to obtain neighborhood information. According to the illustrated embodiment, applications 66 include a discovery engine 70. Discovery engine 70 may perform any suitable operation to gather neighborhood information. For example, discovery engine 70 may receive neighborhood information, derive neighborhood information from received information, and record the information in neighborhood information record 74.

According to one embodiment, discovery engine 70 may receive the neighborhood information in a neighborhood information packet. According to the embodiment, the packet may include neighborhood information and one or more indicator bits. An indicator bit may indicate that neighborhood information is present in the packet. According to one embodiment, a neighborhood information packet may include network information for a plurality of descriptors 82 and an indicator bit for each descriptor 82.

A neighborhood information packet may be received in any suitable manner. According to one embodiment, the neighborhood information packet may be received in a control message associated with a handover procedure performed as mobile node 20 enters cell 22b. The neighborhood information packet may be generated by any suitable neighborhood information packet generator operable to generate the packet, such as mobile node 20 or previous cell site 24a.

Discovery engine 70 may derive neighborhood information from received information in any suitable manner. As an example, neighborhood information may include a cell identifier for neighbor cell 22a one hop away from cell 22b and a cell identifier for a cell 22c one hop away from neighbor cell 22a in a direction away from cell 22a. Discovery engine 70 may derive that cell 22c is two hops away from cell 22b. As another example, neighborhood information may include coverage information for neighbor cell 22a. Discovery engine 70 may derive the boundary between neighbor cell 22a and cell 22b from the coverage of cell 22a and the coverage of cell 22b. As yet another example, neighborhood information may include the location and the signal strength of one or more neighbor cells 22a. Discovery engine 70 may determine the coverage of the neighbor cells 22a from this information, and then derive a coverage map of the neighbor cells 22a from the coverage.

Modifications, additions, or omissions may be made to neighborhood manager 50 without departing from the scope of the invention. The components of neighborhood manager 50 may be integrated or separated according to particular needs. Moreover, the operations of neighborhood manager 50 may be performed by more, fewer, or other modules. Additionally, operations of neighborhood manager 50 may be performed using any suitable logic comprising software, hardware, other logic, or any suitable combination of the preceding.

FIG. 3 is a flowchart illustrating one embodiment of a method operable to dynamically obtain neighborhood information for a cell. The method begins at step 100, where a cell site 24*b* is installed. Cell site 24*b* may be installed by being booted up or activated. Neighborhood information record 74 is initialized at step 104. Neighborhood information record 74 may be managed by neighborhood manager 50 at cell site 24*b*.

Cell site 24*b* determines that mobile node 20 has entered cell 22 at step 108. The determination may be made in response to the initiation of a handover procedure where a previous cell site 24*a* hands over a communication session to a current cell site 24*b* as mobile node 20 moves from previous cell 22*a* to current cell 22*b*. The control flows associated with the handover procedure may include a neighborhood information packet. According to one example, the neighborhood information packet may include information about previous cell 22*a*.

Neighborhood information is obtained at step 112. The information may be obtained by extracting the information directly from the packet or by deriving the information from information extracted from the packet. As an example, the neighborhood information packet may indicate that mobile node 20 moved from previous cell 22*a*. Discovery engine 70 may determine that previous cell 22*a* is a neighbor of current cell 22*b*. The information is recorded at step 116. Discovery engine 70 may then add cell 22*a* to neighborhood information record 74.

As more mobile nodes 20 enter cell 22*b*, discovery engine 70 obtains more neighborhood information about the neighbor cells 22*a*, and may establish detailed information about the neighbor cells 22*a*. If there is a next mobile node 20 at step 120, the method returns to step 112 to obtain neighborhood information associated with movement of the next mobile node 20. If there is no next mobile node at step 120, the method proceeds to step 124. Cell site 24*b* may use the neighborhood information in record 74 at step 124 to perform other operations. After using the neighborhood information, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a cell site of a cell may dynamically obtain neighborhood information describing the neighbor cells of the cell. Dynamically obtaining the neighborhood information may allow the cell site to have updated neighborhood information. Another technical advantage of one embodiment may be that the neighborhood information may be recorded in a neighborhood information record to develop a detailed description of the neighbor cells. The detailed description may allow the cell site to provide improved communication services to mobile nodes.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for obtaining neighborhood information for a cell, comprising:
    facilitating a handover procedure of a mobile node from a previous cell site of a previous cell to a current cell site of a current cell;
    facilitating a communication session for the mobile node;
    determining, at a network manager of the current cell site, neighborhood information in response to facilitating the handover procedure, the neighborhood information describing the previous cell from which the mobile node had moved, the network manager being distinct from the mobile node;
    discovering that the previous cell site is a neighbor of the current cell site in response to the neighborhood information; and
    recording the neighborhood information in a neighborhood information record.

2. The method of claim 1, wherein determining neighborhood information further comprises:
    receiving a message from the mobile node, the message comprising a control message comprising a neighborhood information packet.

3. The method of claim 1, wherein determining neighborhood information further comprises:
    receiving a message from the previous cell site, the message comprising a control message comprising a neighborhood information packet.

4. The method of claim 1, wherein determining the neighborhood information further comprises:
    extracting the neighborhood information from a control message.

5. The method of claim 1, wherein determining the neighborhood information further comprises:
    extracting the neighborhood information from a control message; and
    deriving the neighborhood information from the extracted information.

6. The method of claim 1, wherein determining the neighborhood information further comprises:
    extracting signal strength information associated with a previous cell from a control message; and
    calculating neighborhood information from the signal strength, the neighborhood information comprising coverage information of the previous cell.

7. The method of claim 1, wherein the determining, at the network manager of the current cell site, the neighborhood information in response to facilitating the handover procedure comprises determining, at the network manager of the current cell site, the neighborhood information after facilitating the handover procedure.

8. An apparatus for obtaining neighborhood information for a cell, comprising:
    a memory operable to store a neighborhood information record; and
    logic coupled to the memory and operable to:
        facilitate a handover procedure of a mobile node from a previous cell site of a previous cell to a current cell site of a current cell;
        facilitate a communication session for the mobile node;
        determine, at a network manager of the current cell site, neighborhood information in response to facilitating the handover procedure, the neighborhood information describing the previous cell from which the mobile node had moved, the network manager being distinct from the mobile node;

discover that the previous cell site is a neighbor of the current cell site in response to the neighborhood information; and record the neighborhood information in the neighborhood information record.

9. The apparatus of claim 8, the logic further operable to determine neighborhood information by:

receiving a message from the mobile node, the message comprising a control message comprising the neighborhood information packet.

10. The apparatus of claim 8, the logic further operable to determine neighborhood information by:

receiving a message from the previous cell site, the message comprising a control message comprising the neighborhood information packet.

11. The apparatus of claim 8, the logic further operable to determine the neighborhood information from the neighborhood information packet by:

extracting the neighborhood information from a control message.

12. The apparatus of claim 8, the logic further operable to determine the neighborhood information from the neighborhood information packet by:

extracting the neighborhood information from the neighborhood information packet; and deriving the neighborhood information from a control message.

13. The apparatus of claim 8, the logic further operable to determine the neighborhood information from the neighborhood information packet by:

extracting signal strength information associated with a previous cell from a control message; and calculating neighborhood information from the signal strength, the neighborhood information comprising coverage information of the previous cell.

14. The apparatus of claim 8, the logic further operable to:

receive the message comprising the neighborhood information packet by:

receiving the message from at least one of the mobile node and the previous cell site, the message comprising a control message comprising the neighborhood information packet;

determine the neighborhood information from the neighborhood information packet by:

extracting the neighborhood information from the neighborhood information packet;

extracting the information from the neighborhood information packet;

deriving the neighborhood information from the extracted information;

extracting signal strength information associated with a previous cell from the neighborhood information packet; and calculating neighborhood information from the signal strength, the neighborhood information comprising coverage information of the previous cell.

15. The apparatus of claim 8, wherein the logic is further operable to determine, at the network manager of the current cell site, the neighborhood information after facilitating the handover procedure.

16. A system for obtaining neighborhood information for a cell, comprising:

means for facilitating a handover procedure of a mobile node from a previous cell site of a previous cell to a current cell site of a current cell;

means for facilitating a communication session for the mobile node;

means for determining, at a network manager of the current cell site, neighborhood information in response to facilitating the handover procedure, the neighborhood information describing the previous cell from which the mobile node had moved, the network manager being distinct from the mobile node;

means for discovering that the previous cell site is a neighbor of the current cell site in response to the neighborhood information; and means for recording the neighborhood information in a neighborhood information record.

17. The apparatus of claim 16, wherein the means for determining, at the network manager of the current cell site, the neighborhood information in response to facilitating the handover procedure comprises means for determining, at the network manager of the current cell site, the neighborhood information after facilitating the handover procedure.

18. A system for obtaining neighborhood information for a cell, comprising:

a neighborhood information packet generator operable to generate a neighborhood information packet; and a neighborhood manager of a current cell site of a current cell, the neighborhood manager in communication with the neighborhood information packet generator and operable to:

facilitate a handover procedure of a mobile node from a previous cell site of a previous cell to the current cell site;

receive a message comprising the neighborhood information packet;

in response to facilitating the handover procedure, determine neighborhood information from the neighborhood information packet, the neighborhood information describing the previous cell from which the mobile node had moved, the network manager being distinct from the mobile node;

discover that the previous cell site is a neighbor of the current cell site in response to the neighborhood information; and record the neighborhood information in a neighborhood information record.

19. The system of claim 18, wherein the neighborhood manager is further operable to determine the neighborhood information from the neighborhood information packet after facilitating the handover procedure.

20. The system of claim 18, the neighborhood manager further operable to receive the message comprising the neighborhood information packet by:

receiving the message from the mobile node, the message comprising a control message comprising the neighborhood information packet.

21. The system of claim 18, the neighborhood manager further operable to receive the message comprising the neighborhood information packet by:

receiving the message from the previous cell site, the message comprising a control message comprising the neighborhood information packet.

22. The system of claim 18, the neighborhood manager further operable to determine the neighborhood information from the neighborhood information packet by:

extracting the neighborhood information from the neighborhood information packet.

23. The system of claim 18, the neighborhood manager further operable to determine the neighborhood information from the neighborhood information packet by:

extracting the information from the neighborhood information packet; and deriving the neighborhood information from the extracted information.

24. The system of claim 18, the neighborhood manager further operable to determine the neighborhood information from the neighborhood information packet by:

extracting signal strength information associated with a previous cell from the neighborhood information packet; and calculating neighborhood information from the signal strength, the neighborhood information comprising coverage information of the previous cell.

25. The system of claim 18, the neighborhood manager further operable to:

receive the message comprising the neighborhood information packet by:

receiving the message from at least one of the mobile node and the previous cell site, the message comprising a control message comprising the neighborhood information packet;

determine the neighborhood information from the neighborhood information packet by:

extracting the neighborhood information from the neighborhood information packet;

extracting the information from the neighborhood information packet;

deriving the neighborhood information from the extracted information;

extracting signal strength information associated with a previous cell from the neighborhood information packet; and calculating neighborhood information from the signal strength, the neighborhood information comprising coverage information of the previous cell.

26. A system for obtaining neighborhood information for a cell, comprising:

means for generating a neighborhood information packet;

means for facilitating a handover procedure of a mobile node from a previous cell site of a previous cell to a current cell site of a current cell;

means for receiving a message comprising the neighborhood information packet;

means for determining, in response to facilitating the handover procedure, at a network manager of the current cell site, neighborhood information from the neighborhood information packet, the neighborhood information describing the previous cell from which the mobile node had moved, the network manager being distinct from the mobile node;

means for discovering that the previous cell site is a neighbor of the current cell site in response to the neighborhood information; and means for recording the neighborhood information in a neighborhood information record.

27. The system of claim 26, wherein the means for determining, in response to facilitating the handover procedure, at the network manager of the current cell site, the neighborhood information from the neighborhood information packet comprises means for determining, after facilitating the handover procedure, at the network manager of the current cell site, the neighborhood information from the neighborhood information packet.

* * * * *